(12) United States Patent
Katano

(10) Patent No.: US 11,486,545 B2
(45) Date of Patent: Nov. 1, 2022

(54) TANK AND MANUFACTURING METHOD FOR TANK

(71) Applicant: TOYOTA JIDOSHA KABUSHIKI KAISHA, Toyota (JP)

(72) Inventor: Koji Katano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/325,321

(22) Filed: May 20, 2021

(65) Prior Publication Data

US 2022/0034449 A1  Feb. 3, 2022

(30) Foreign Application Priority Data

Jul. 31, 2020 (JP) ................ JP2020-130159

(51) Int. Cl.
*F17C 1/06* (2006.01)
*F17C 1/16* (2006.01)
*F17C 13/04* (2006.01)
*B29C 53/60* (2006.01)
*B29C 53/58* (2006.01)
(Continued)

(52) U.S. Cl.
CPC ............. *F17C 1/06* (2013.01); *B29C 53/582* (2013.01); *B29C 53/602* (2013.01); *F17C 1/12* (2013.01); *F17C 1/16* (2013.01); *F17C 13/04* (2013.01); *B29L 2031/7156* (2013.01); *F17C 2201/0109* (2013.01); *F17C 2203/0604* (2013.01); *F17C 2203/0673* (2013.01); *F17C 2205/0394* (2013.01); *F17C 2209/2163* (2013.01); *F17C 2209/227* (2013.01)

(58) Field of Classification Search
CPC ........... B29C 53/602; B29L 2031/7156; F17C 2207/0109; F17C 2203/0604; F17C 2203/0673; F17C 2201/0114; F17C 1/12
USPC ....................................................... 220/590
See application file for complete search history.

(56) References Cited

U.S. PATENT DOCUMENTS

| 2003/0019874 A1* | 1/2003 | Wright .............. F17C 1/06 156/195 |
| 2010/0213198 A1* | 8/2010 | Brown .............. F17C 1/06 220/560.08 |

(Continued)

FOREIGN PATENT DOCUMENTS

| JP | 2012-127468 A | 7/2012 |
| JP | 2018-522968 A | 8/2018 |

(Continued)

*Primary Examiner* — Valentin Neacsu
*Assistant Examiner* — Laura E. Parker
(74) *Attorney, Agent, or Firm* — Finnegan, Henderson, Farabow, Garrett & Dunner, LLP

(57) ABSTRACT

A manufacturing method for manufacturing a tank includes: a step of forming a structural body constituted by a liner and a fiber reinforced resin layer placed on the outer periphery of the liner, the structural body including a cylindrical portion and dome portions provided in opposite ends of the cylindrical portion in the axial direction of the cylindrical portion; a step of winding a heat insulating sheet around the fiber reinforced resin layer after the step of forming the structural body, the heat insulating sheet having notches in dome forming portions provided to correspond to the dome portions; and a step of covering the dome portions with the dome forming portions.

6 Claims, 15 Drawing Sheets

(51) Int. Cl.
  *F17C 1/12*      (2006.01)
  *B29L 31/00*     (2006.01)

(56) References Cited

U.S. PATENT DOCUMENTS

2018/0202553 A1\* 7/2018 Ueda ....................... B32B 5/245
2019/0203883 A1\* 7/2019 Kojima .................... F17C 1/02

FOREIGN PATENT DOCUMENTS

| JP | 2019-120263 A | 7/2019 | | |
|----|---------------|--------|----|----|
| JP | 6549514 B2 \* | 7/2019 | | |
| WO | WO 2016/198425 A1 | 12/2016 | | |
| WO | WO-2019059495 A1 \* | 3/2019 | ............. | B29C 45/16 |

\* cited by examiner

TANK AND MANUFACTURING METHOD FOR TANK

CROSS-REFERENCE TO RELATED APPLICATION

This application claims priority to Japanese Patent Application No. 2020-130159 filed on Jul. 31, 2020, incorporated herein by reference in its entirety.

BACKGROUND

1. Technical Field

This disclosure relates to a tank and a manufacturing method for manufacturing a tank.

2. Description of Related Art

Japanese Unexamined Patent Application Publication No. 2019-120263 (JP 2019-120263 A) describes the following. That is, a reinforced layer made of CFRP is formed on a liner. The thickness of the reinforced layer in a dome portion of the liner is thinner than the thickness of the reinforced layer in a cylindrical portion. A tank protector having a two-layer structure is placed in the dome portion where the reinforced layer is thinned. Expanded graphite that expands by heating to exhibit fire-resisting and heat-insulating properties is added to at least one of two layers of the tank protector.

SUMMARY

On advancing a weight reduction in a tank in the future, such an expanded graphite layer may be desired to be provided in a wide range in the outer periphery of the tank. An appropriate manufacturing method or structure for such a case is desired.

This disclosure is achievable in the following aspects.

(1) One aspect of this disclosure provides a manufacturing method for manufacturing a tank. The manufacturing method includes: a step of forming a structural body constituted by a liner and a fiber reinforced resin layer placed on an outer periphery of the liner, the structural body including a cylindrical portion and dome portions provided in opposite ends of the cylindrical portion in the axial direction of the cylindrical portion; a step of winding a heat insulating sheet around the fiber reinforced resin layer after the step of forming the structural body, the heat insulating sheet having notches in dome forming portions provided to correspond to the dome portions; and a step of covering the dome portions with the dome forming portions. With this aspect, a heat insulating layer can be placed on both the cylindrical portion and the dome portions of the structural body.

(2) In the manufacturing method according to the above aspect, the heat insulating sheet may include adhesive layers or adhesive agents on opposite surfaces of the dome forming portions. The heat insulating sheet may include an adhesive layer or an adhesive agent on one surface of a region between the dome forming portions. After the step of winding the heat insulating sheet, the adhesive layers or the adhesive agents provided in the dome forming portions corresponding to the dome portions may be exposed, and tank protectors may be attached to the dome forming portions. With this aspect, since the heat insulating sheet includes the adhesive layers or the adhesive agents on the opposite surfaces of the dome forming portions, a step of applying an adhesive agent or the like to the dome forming portions is not necessary after the heat insulating sheet is attached.

(3) In the manufacturing method according to the above aspect, the structural body may include a mouth piece and a fusible plug valve attached to the mouth piece, the mouth piece and the fusible plug valve being provided in one of the dome portions. Heat insulation performance of the heat insulating sheet in a part covering the one of the dome portions may be lower than heat insulation performance of the heat insulating sheet in a part covering the other one of the dome portions. In this aspect, the heat insulation performance of the heat insulating sheet on the mouth piece side is lower than the heat insulation performance of the heat insulating sheet on a side opposite to the mouth piece. Accordingly, when the tank is heated for some reason, for example, the fusible plug valve connected to the mouth piece is operated by heating the fusible plug valve, so that the pressure of the tank can be released.

(4) One aspect of this disclosure provides a tank. The tank includes a structural body and a heat insulating layer. The structural body is constituted by a liner and a fiber reinforced resin layer formed on an outer periphery of the liner, and the structural body includes a cylindrical portion and dome portions provided in opposite ends of the cylindrical portion in the axial direction of the cylindrical portion. The heat insulating layer is placed on an outer side of the structural body, and the heat insulating layer is formed by use of a heat insulating sheet. The heat insulating sheet includes: dome forming portions covering the dome portions, the dome forming portions having notches; and an intermediate portion provided as a region between the dome forming portions such that the intermediate portion is wound around the cylindrical portion of the structural body in the circumferential direction of the cylindrical portion. With this aspect, the heat insulating layer can be formed in the cylindrical portion, and the heat insulating layer can be easily formed in the dome portions by the notches.

(5) The tank according to the above aspect may include tank protectors provided on outer sides of the dome portions. With this aspect, the tank can be protected by the tank protectors.

(6) The tank according to the above aspect may include a mouth piece and a fusible plug valve attached to the mouth piece. The mouth piece and the fusible plug valve may be provided in one of the dome portions. Heat insulation performance of the heat insulating sheet in a part covering the one of the dome portions may be lower than heat insulation performance of the heat insulating sheet in a part covering the other one of the dome portions. In this aspect, the heat insulation performance of the heat insulating layer on the mouth piece side is lower than the heat insulation performance of the heat insulating layer on a side opposite to the mouth piece. Accordingly, when the tank is heated for some reason, for example, the fusible plug valve connected to the mouth piece is operated by heating the fusible plug valve, so that the pressure of the tank can be released.

This disclosure is also achievable in various forms other than the tank and the manufacturing method for manufacturing the tank. For example, this disclosure is achievable in forms such as a heat insulating method for a tank and a heat insulating structure for a tank.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
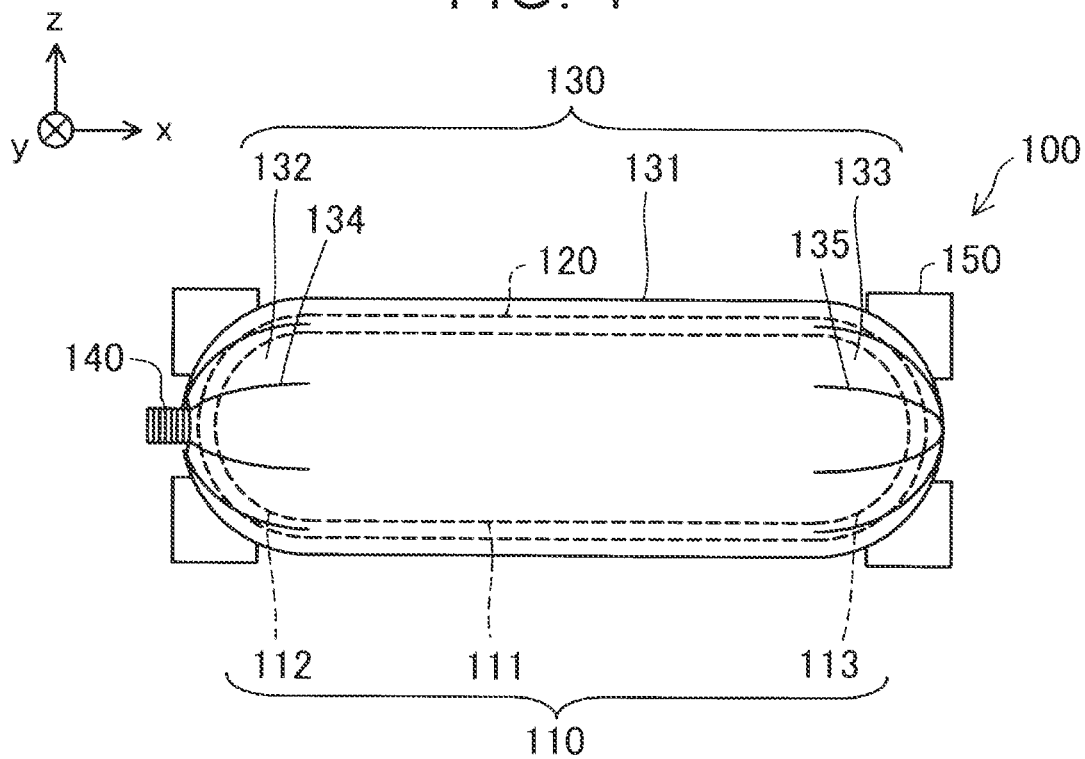
FIG. 1 is an explanatory view illustrating a tank according to a first embodiment.

FIG. 1 is an explanatory view illustrating a tank 100 according to a first embodiment. The tank 100 includes a liner 110, a fiber reinforced resin layer 120, a heat insulating layer 130, a mouth piece 140, and tank protectors 150.

The liner 110 is a member made of resin and including a cylindrical portion 111 having a generally cylindrical shape and dome portions 112, 113 having a dome shape with a generally hemisphere face, the dome portions 112, 113 being formed on the opposite sides of the cylindrical portion 111. Fuel gas such as hydrogen or LP gas is stored inside the liner 110. The resin to form the liner 110 will be described later.

The fiber reinforced resin layer 120 functions as a reinforced layer configured to reinforce the liner 110. The fiber reinforced resin layer 120 will be described later.

The heat insulating layer 130 includes a cylindrical portion 131 and dome-shaped portions 132, 133. The heat insulating layer 130 is a layer containing graphite particles and urethane resin. When the heat insulating layer 130 is exposed to heat, the graphite particles inside the heat insulating layer 130 expand and get entangled with each other, so that a heat insulating layer having large-capacity gaps is formed. Further, since the graphite particles are incombustible, the heat insulating layer 130 also has a fire-resisting property in addition to a heat-insulating property. For example, even when a vehicle equipped with the tank 100 is exposed to flames for some reason, the graphite particles in the heat insulating layer 130 expand by receiving heat of the flames without burning, so that the heat insulating layer 130 restrains heat transmission to the tank 100.

The dome-shaped portion 132 has cuts 134, and the dome-shaped portion 133 has cuts 135. The cuts 134 are boundaries between dome forming pieces to form the dome-shaped portion 132, and the cuts 135 are boundaries between dome forming pieces to form the dome-shaped portion 133. The cuts 134, 135 are parts of large circles intersecting with a plane perpendicular to an axis O of the tank 100 and passing through respective top parts of the dome-shaped portions 132, 133. Note that the cuts 134, 135 may not be parts of the large circles of the dome-shaped portions 132, 133.

The mouth piece 140 is provided in a top part of the dome portion 112 as a first dome portion and is not provided in the dome portion 113 as a second dome portion. As will be described later, a main stop valve is attached to the mouth piece 140, and a fusible plug valve is attached to the main stop valve.

The tank protectors 150 are attached to respective outer sides of the dome-shaped portions 132, 133. The tank protectors 150 protrude outward from the heat insulating layer 130 in the axis-O direction of the tank 100, and the tank protectors 150 also protrude outward from the heat insulating layer 130 in a direction perpendicular to the axis O. Even if the tank 100 falls during transportation or the like of the tank 100, the tank protectors 150 hit the ground or the like instead of the tank 100, thereby making it possible to restrain the tank 100 from being damaged due to the falling.

Figure 2:
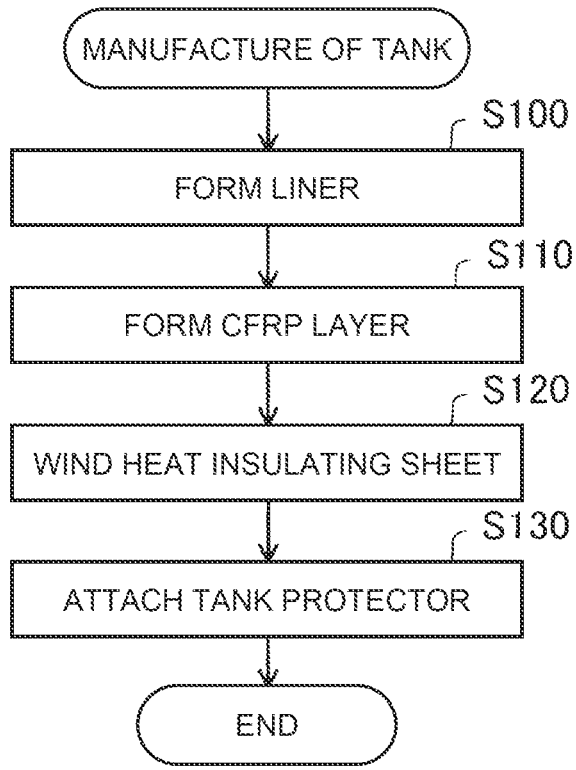
FIG. 2 is an explanatory view illustrating a manufacturing process of the tank.

FIG. 2 is an explanatory view illustrating a manufacturing process of the tank 100. In step S100, the liner 110 is formed. In step S110, a carbon fiber reinforced plastics (CFRP) layer 120 as the fiber reinforced resin layer is formed on an outer side of the liner 110. In step S120, the heat insulating layer 130 is formed by winding a heat insulating sheet around an outer side of the CFRP layer 120. After that, in step S130, the tank protectors 150 are attached to the dome-shaped portions 132, 133.

Figure 3:
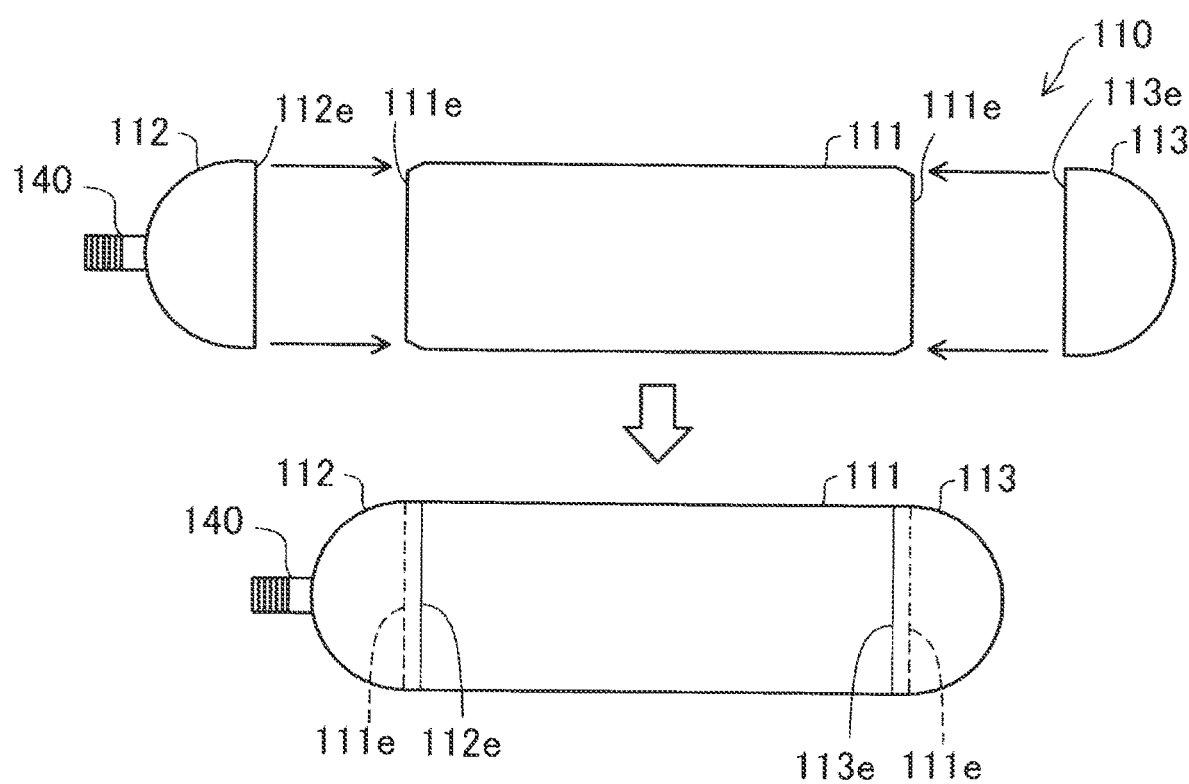
FIG. 3 is an explanatory view illustrating a manufacturing process of a liner.

FIG. 3 is an explanatory view illustrating the manufacturing process of the liner 110. The cylindrical portion 111, the dome portion 112 provided with the mouth piece 140, and the dome portion 113 not provided with a mouth piece are formed by injection molding of resin. The resin used for the injection molding is polyamide, for example. Note that thermoplastic resin such as polyethylene, ethylene-vinyl alcohol copolymer resin (EVOH), or polyester or thermosetting resin such as epoxy may be used other than polyamide, for example.

End parts 111e of the cylindrical portion 111 in its axial direction have an outside diameter slightly smaller than that of parts other than the end parts 111e. An end part 112e opposite to the top part of the dome portion 112 has a large inside diameter, and an end part 113e opposite to a top part of the dome portion 113 also has a large inside diameter. On that account, the dome portions 112, 113 can be fitted to the opposite ends of the cylindrical portion 111 from outer peripheral sides of the opposite ends. In a case where the cylindrical portion 111 and the dome portions 112, 113 in FIG. 3 are made of thermoplastic resin, the cylindrical portion 111 is bonded to the dome portions 112, 113 by an adhesive agent, or the cylindrical portion 111 is bonded to the dome portions 112, 113 by melting the thermoplastic resin by heating, by a laser beam or the like, joined portions between the cylindrical portion 111 and the dome portions 112, 113. In a case where the cylindrical portion 111 and the dome portions 112, 113 are made of thermosetting resin, the cylindrical portion 111 is bonded to the dome portions 112, 113 by an adhesive agent. As the adhesive agent, an adhesive agent made of epoxy-based resin is used, for example. Note that the inside diameters of the end parts 111e of the cylindrical portion 111 in the axial direction may be made large, and the outside diameters of the end part 112e of the dome portion 112 and the end part 113e of the dome portion 113 may be made small. In this case, the dome portions 112, 113 can be fitted to the opposite ends of the cylindrical portion 111 from inner peripheral sides of the opposite ends.

Figure 4:
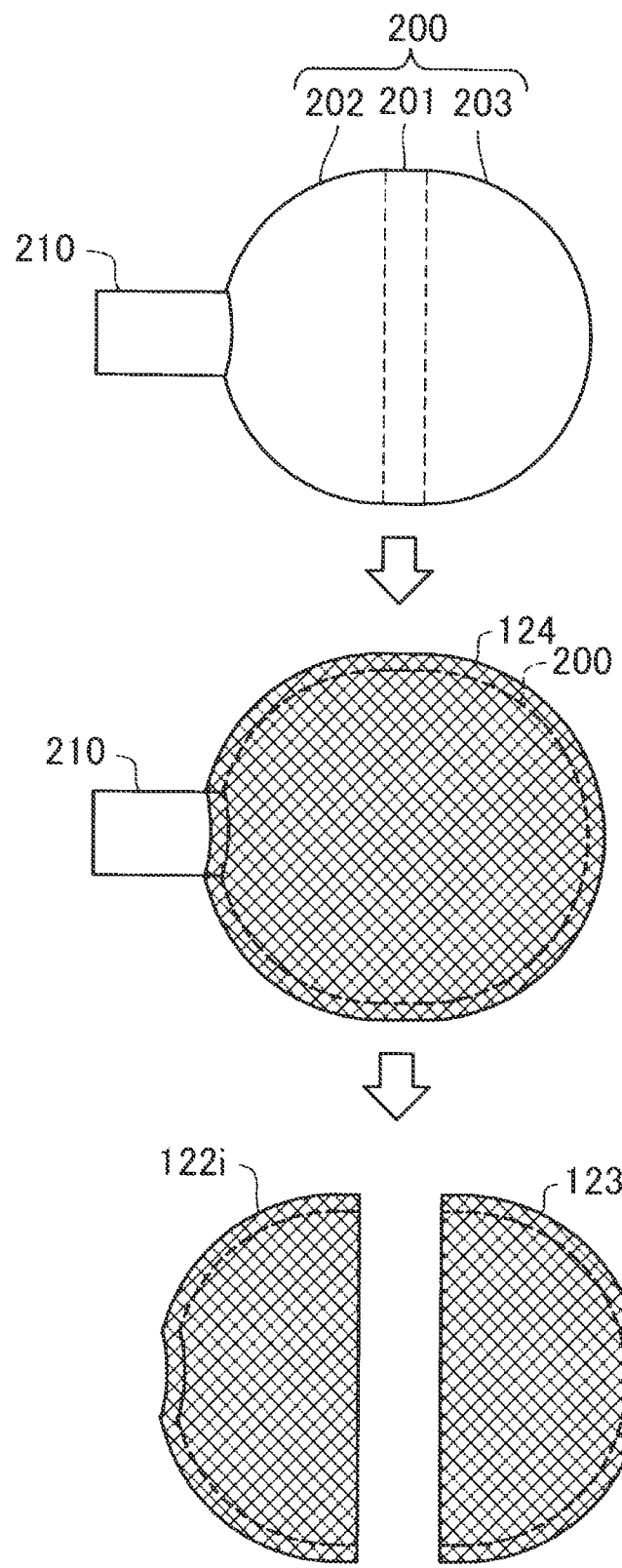
FIG. 4 is an explanatory view illustrating a step of forming dome-shaped reinforced-layer inner layers in a CFRP layer.

FIG. 4 is an explanatory view illustrating a step of forming dome-shaped reinforced-layer inner layers 122i, 123i in the CFRP layer 120. A mandrel 200 the opposite sides of which have a dome shape is prepared. The shape of the surface of the mandrel 200 is formed such that two dome shapes 202, 203 are connected to each other via a short cylinder 201. The broken lines in FIG. 4 are lines indicative of boundaries between the dome shapes 202, 203 and the cylinder 201 for convenience. A fiber bundle 124 impregnated with resin is wound around an outer surface of the mandrel 200 by a filament winding method (FW method). At this time, it is preferable to wind the fiber bundle 124 such that the fiber bundle 124 intersects with the axial direction of a shaft 210 at an angle of 40°. Note that the angle at which the fiber bundle 124 is wound should be 30° or more as the lower limit and 60° or less as the upper limit, for example. In the present embodiment, carbon fiber is used as the fiber of the fiber bundle 124. This is because carbon fiber is preferable from the viewpoint of lightness, mechanical strength, and the like. Note that glass fiber, barmaid fiber, or boron fiber may be used, for example, instead of carbon fiber. In the present embodiment, as the resin with which the fiber is impregnated, epoxy resin is used. This is because epoxy resin is preferable from the viewpoint of mechanical strength and the like. Note that, as the resin with which the fiber is impregnated, thermosetting resin such as phenolic resin, melamine resin, or urea resin may be used other than epoxy resin. Further, thermoplastic resin such as poly ether ether ketone, polyphenylenesulfide, polyacrylate, polyimide, or polyamide may be used other than the thermosetting resin.

After the resin with which the fiber bundle 124 is impregnated is hardened, a part corresponding to the cylinder 201 in a winding body wound on the outer surface of the mandrel 200 is divided into two along the outer periphery of the cylinder 201 by use of a cutter, for example, and the dome-shaped reinforced-layer inner layers 122i, 123i are formed. After that, the dome-shaped reinforced-layer inner layers 122i, 123i are shaped. For example, a cut part cut by use of the cutter, that is, the inside of an end part opposite to a top part in each of the dome-shaped reinforced-layer inner layers 122i, 123i is thinned slightly. This is to easily fit the cut part to a cylindrical reinforced-layer inner layer (described later). Note that the diameter of a generally center of the cylinder 201 of the mandrel 200 may be made slightly large.

Figure 5:
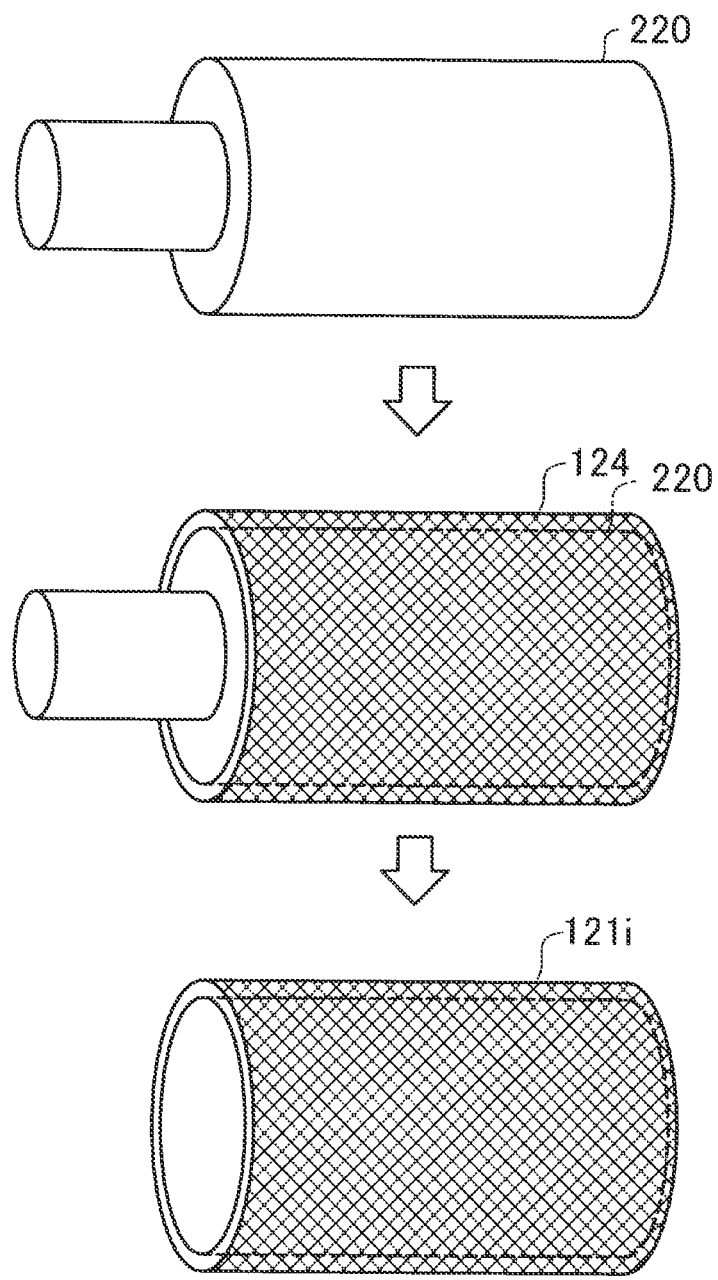
FIG. 5 is an explanatory view illustrating a step of forming a cylindrical reinforced-layer inner layer in the CFRP layer.

FIG. 5 is an explanatory view illustrating a step of forming a cylindrical reinforced-layer inner layer 121i in the CFRP layer 120. A cylindrical mandrel 220 is prepared. The outside diameter of the mandrel 220 is the same as the outside diameter of the liner 110. The fiber bundle 124 impregnated with resin is wound around a cylindrical surface of the mandrel 220 by the filament winding method (FW method). Note that a fiber sheet impregnated with resin may be wound around the cylindrical surface of the mandrel 220. After the resin with which the fiber is impregnated is hardened, the mandrel 220 is removed, so that the cylindrical reinforced-layer inner layer 121i is formed. After that, the cylindrical reinforced-layer inner layer 121i is shaped. For example, respective outer sides of the opposite ends of the cylindrical reinforced-layer inner layer 121i in its axial direction are shaved to be thinned. This is to easily fit the cylindrical reinforced-layer inner layer 121i to the end parts of the dome-shaped reinforced-layer inner layers 122i, 123i. Accordingly, respective outer sides of the end parts of the dome-shaped reinforced-layer inner layers 122i, 123i may be shaved to be thinned, and respective inner sides of the opposite ends of the cylindrical reinforced-layer inner layer 121i in its axial direction may be shaved to be thinned.

Figure 6:
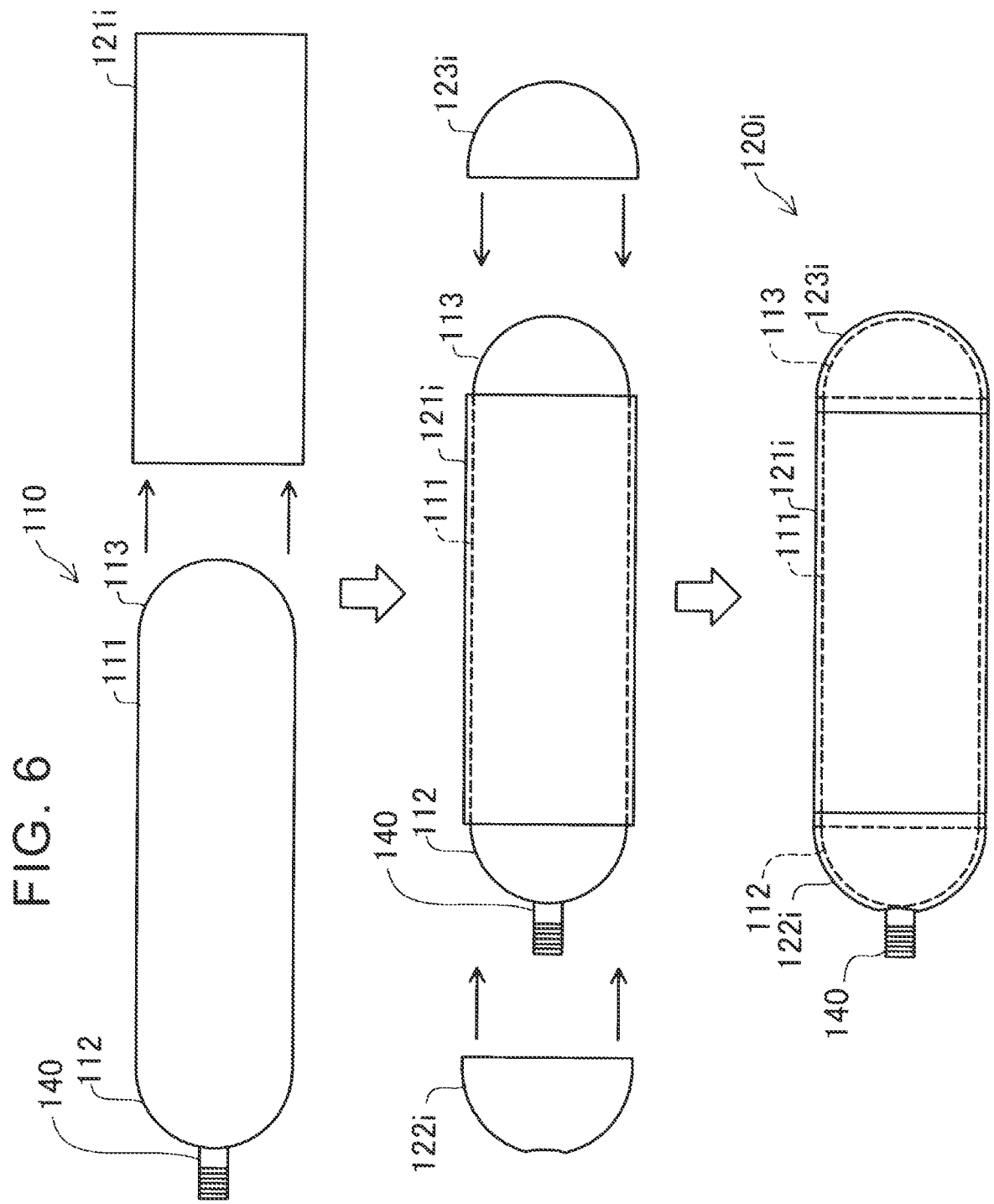
FIG. 6 is an explanatory view illustrating a step of assembling the cylindrical reinforced-layer inner layer and the dome-shaped reinforced-layer inner layers to the liner.

FIG. 6 is an explanatory view illustrating a step of assembling the cylindrical reinforced-layer inner layer 121i and the dome-shaped reinforced-layer inner layers 122i, 123i to the liner 110. The cylindrical portion 111 of the liner 110 is inserted into the cylindrical reinforced-layer inner layer 121i. After that, the dome portions 112, 113 of the liner 110 are covered with the dome-shaped reinforced-layer inner layers 122i, 123i, so that a reinforced-layer inner layer 120i is formed. Here, the cylindrical reinforced-layer inner layer 121i is bonded to the dome-shaped reinforced-layer inner layers 122i, 123i by an adhesive agent, for example Note that the cylindrical portion 111 of the liner 110 may be bonded to the cylindrical reinforced-layer inner layer 121i by an adhesive agent, the dome portion 112 may be bonded to the dome-shaped reinforced-layer inner layer 122i by an adhesive agent, and the dome portion 113 may be bonded to the dome-shaped reinforced-layer inner layer 123i by an adhesive agent.

Figure 7:
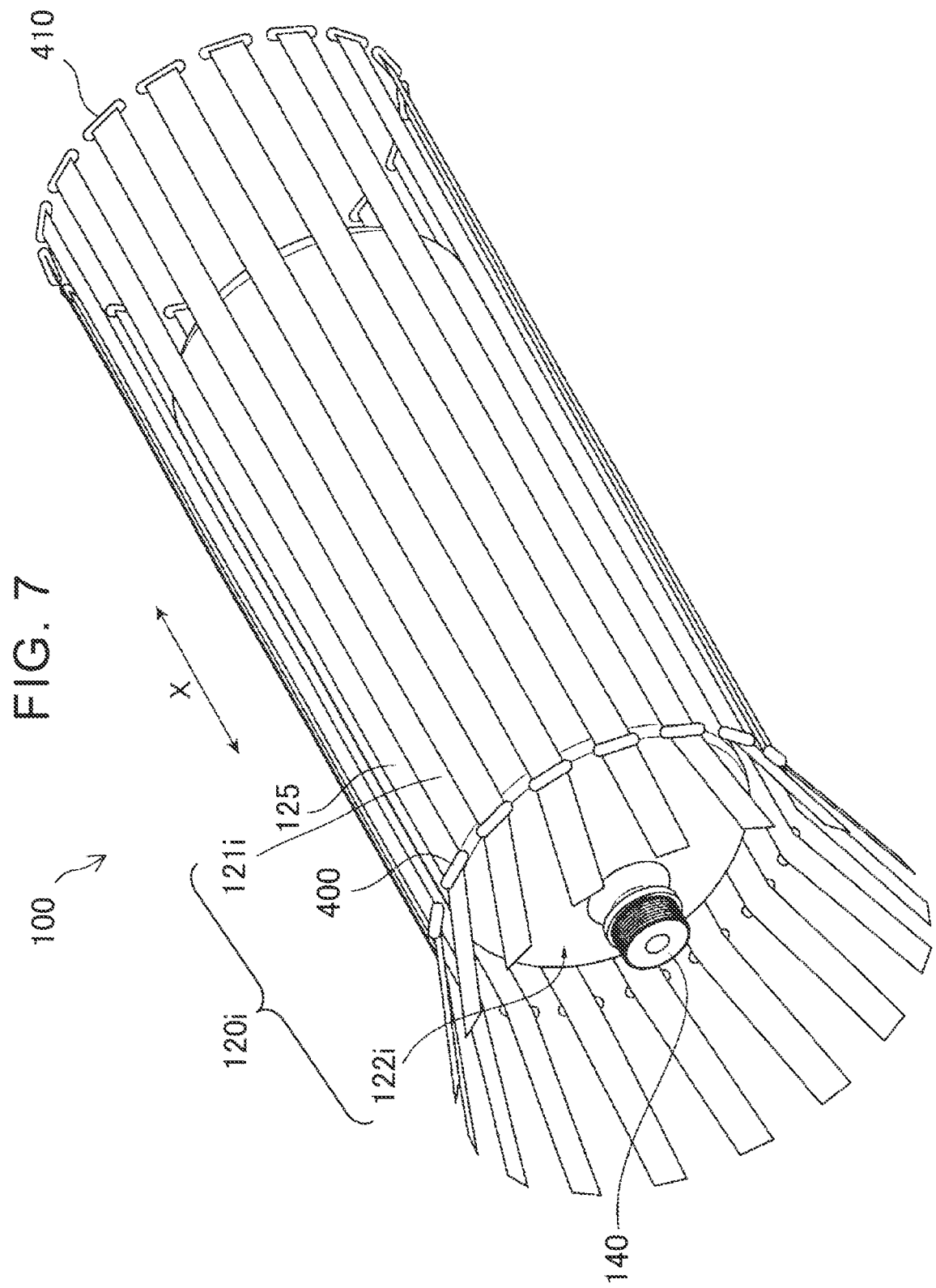
FIG. 7 is an explanatory view illustrating a step of forming a reinforced-layer outer layer.
Figure 8:
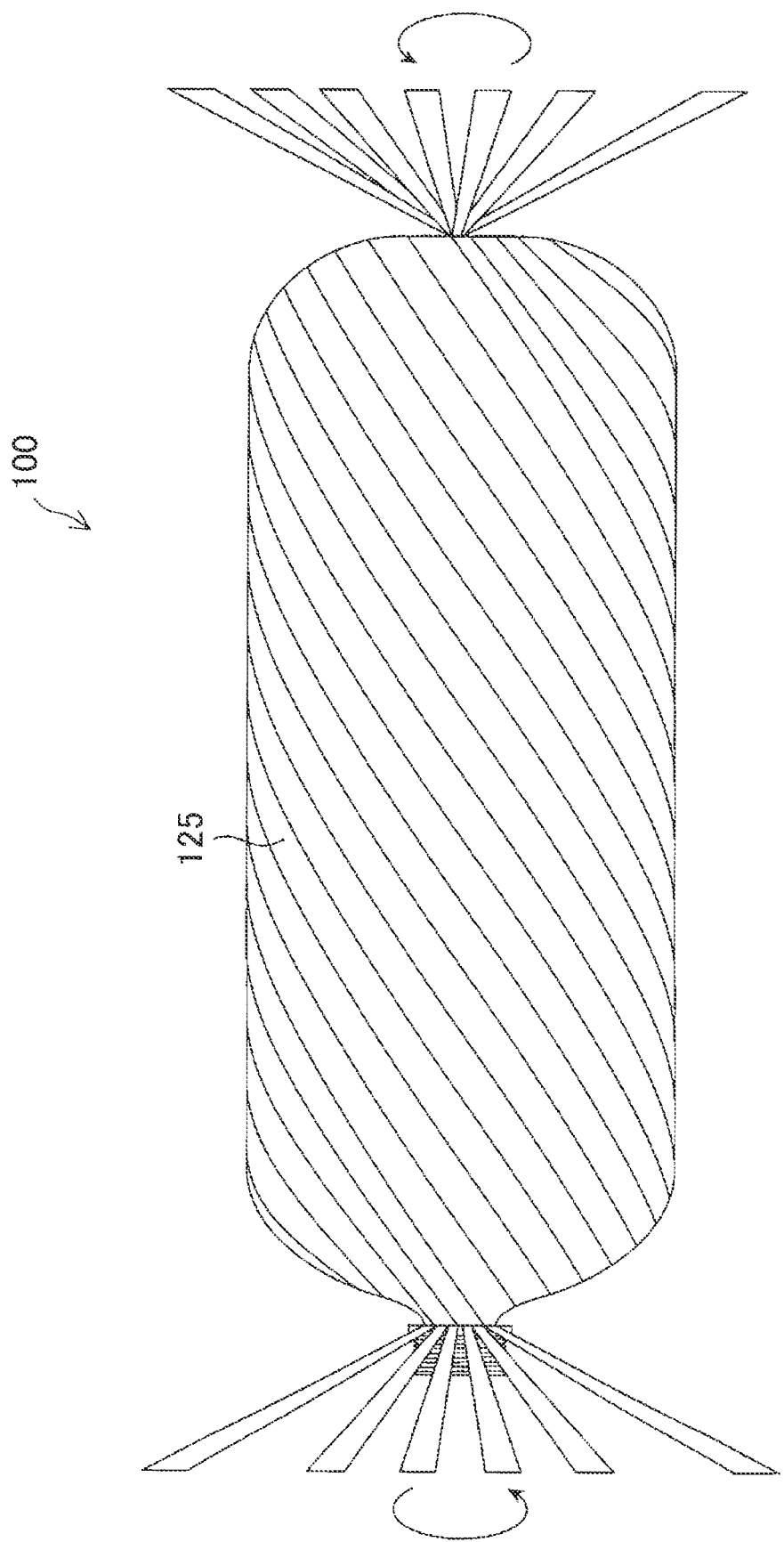
FIG. 8 is an explanatory view illustrating a step of forming the reinforced-layer outer layer.

FIGS. 7, 8 are explanatory views illustrating steps of forming a reinforced-layer outer layer 120o. A support mechanism (not shown) is attached to the mouth piece 140 of the tank 100 on which the reinforced-layer inner layer 120i is formed, so that the tank 100 is held by the support mechanism. Note that FIGS. 7, 8 illustrate a state where the tank 100 is placed horizontally. However, the tank 100 may be placed vertically so as to prevent the tank 100 from bending downward by gravity.

Subsequently, a plurality of fiber bundles 125 impregnated with resin is extended in an axial direction X of the tank 100, and the fiber bundles 125 are placed at predetermined angular intervals in the circumferential direction of the tank 100 such that the fiber bundles 125 are separated from an outer surface of the reinforced-layer inner layer 120i of the tank 100 at a predetermined distance. At this time, the fiber bundles 125 are unwound via respective unwinding portions 400 of an unwinding device, and distal ends of the fiber bundles 125 are held by respective holding members 410.

In the present embodiment, as the resin with which the fiber bundles 125 are impregnated, epoxy resin is used. Epoxy resin is preferable from the viewpoint of mechanical strength and the like. Note that, as the resin with which the fiber bundles 125 are impregnated, thermosetting resin such as phenolic resin, melamine resin, or urea resin may be used other than epoxy resin. Further, in the present embodiment, carbon fiber is used as fiber to form the fiber bundles 125.

Carbon fiber is preferable from the viewpoint of lightness, mechanical strength, and the like. Note that, as the fiber to form the fiber bundles 125, glass fiber, aramid fiber, or boron fiber may be used other than carbon fiber.

After that, the unwinding portions 400 and the holding members 410 are rotated in directions reverse to each other along the circumferential direction of the tank 100 from the state illustrated in FIG. 7, so that a first end side part of the fiber bundles 125 (the unwinding portion 400 side) and a second end side part of the fiber bundles 125 (the holding member 410 side) rotate relative to each other in the circumferential direction of the tank 100. Herein, the first end side part of the fiber bundles 125 is rotated in a first direction, and the second end side part of the fiber bundles 125 is rotated in a second direction that is a reverse direction to the first direction. Hereby, as illustrated in FIG. 8, the fiber bundles 125 are inclined relative to the axial direction X of the tank 100, and gaps between the fiber bundles 125 are eliminated, so that the fiber bundles 125 partially overlap each other. Then, the fiber bundles 125 are gradually brought close to the outer surface of the reinforced-layer inner layer 120$i$, so that the fiber bundles 125 are placed on the outer surface of the reinforced-layer inner layer 120$i$ without any gap. At this time, the fiber bundles 125 make close contact with the outer surface of the reinforced-layer inner layer 120$i$ in a state where the fiber bundles 125 are inclined relative to the axial direction X, and the movement of parts of the fiber bundles 125 that make close contact with the outer surface of the reinforced-layer inner layer 120$i$ is restricted by cohesive force of the resin. After that, the first end side part and the second end side part of the fiber bundles 125 are twisted by the unwinding portions 400 and the holding members 410 outside the end parts of the tank 100, so that the first end side part and the second end side pan of the fiber bundles 125 are wound around respective outer surfaces of the dome-shaped reinforced-layer inner layer 122$i$ and the dome-shaped reinforced-layer inner layer 123$i$ (not shown). Thus, the reinforced-layer outer layer 120$o$ is formed to cover the outer surface of the reinforced-layer inner layer 120$i$. After that, unnecessary parts of the fiber bundles 125 are cut, so that a first layer of the fiber bundles 125 is formed.

Since the fiber bundles 125 prevent the dome-shaped reinforced-layer inner layers 122$i$, 123$i$ from deviating outwardly in the axial direction X from the cylindrical reinforced-layer inner layer 121$i$ due to gas pressure, the fiber bundles 125 are provided along the axial direction X of the tank 100. The inclination angle (the angle to the axial direction X of the tank 100) of the fiber bundles 125 is not limited in particular. However, it is preferable that the fiber bundles 125 be arranged to be inclined at an angle larger than 0° from the axial direction X of the tank 100. It is more preferable that the inclination angle of the fiber bundles 125 be larger than 10°. Further, the upper limit of the inclination angle is preferably 45° or less, more preferably 20° or less.

Subsequently, a second layer of the fiber bundles 125 in the reinforced-layer outer layer 120$o$ is formed in the same manner as the first layer. Note that, at the time when the second layer is formed, the first end side part (the unwinding portion 400 side) of the fiber bundles 125 is rotated in the second direction, and the second end side part (the holding member 410 side) of the fiber bundles 125 is rotated in the first direction. Note that, in a case where a third layer and its subsequent layers are to be formed, odd-numbered layers are formed in the same manner as the first layer, and even-numbered layers are formed in the same manner as the second layer. Here, a layer in which the inclination angle of the fiber bundles 125 is the same as that of the first layer is referred to as a "first inclination layer 120$o$1," and a layer in which the inclination angle of the fiber bundles 125 is the same as that of the second layer is referred to as a "second inclination layer 120$o$2."

The number of layers in the reinforced-layer outer layer 120$o$ is not limited in particular, provided that the strength of the reinforced-layer outer layer 120$o$ is secured. However, the number of layers in the reinforced-layer outer layer 120$o$ is preferably 2 to 12, more preferably 2, for example. Note that it is preferable that the number of layers in the reinforced-layer outer layer 120$o$ be as small as possible, provided that the strength of the reinforced-layer outer layer 120$o$ is secured. Further, the number of layers in the reinforced-layer outer layer 120$o$ is preferably an even number. The reason is as follows. The first inclination layer 120$o$1 that is an odd-numbered layer is placed such that the fiber bundles 125 are inclined from the axial direction X while the fiber bundles 125 have a predetermined tensile force, and after that, the first inclination layer 120$o$1 is hardened in the state where the fiber bundles 125 are inclined. Accordingly, when a force to expand is applied to the liner 110 of the tank 100 due to gas pressure, a force in a direction to cancel the inclination from the axial direction X is generated in the first inclination layer 120$o$1, so that a strain occurs in the CFRP layer 120. Similarly, the second inclination layer 120$o$2 that is an even-numbered layer is placed such that the fiber bundles 125 are inclined in a direction opposite to the first inclination layer 120$o$1 while the fiber bundles 125 have a predetermined tensile force, and after that, the second inclination layer 120$o$2 is hardened in the state where the fiber bundles 125 are inclined. Accordingly, when a force to expand is applied to the liner 110 due to gas pressure, a force in a direction to cancel the inclination in the direction opposite to the first inclination layer 120$o$1 is generated in the second inclination layer 120$o$2, so that a strain occurs in the CFRP layer 120. However, the first inclination layer 120$o$1 and the second inclination layer 120$o$2 are inclined in directions opposite to each other. Accordingly, when a force to expand is applied to the reinforced-layer outer layer 120$o$ due to gas pressure, the force in the direction to cancel the inclination of the first inclination layer 120$o$1 and the force in the direction to cancel the inclination of the second inclination layer 120$o$2 work to cancel each other. Here, in a case where the number of layers in the reinforced-layer outer layer 120$o$ is an even number, the number of the first inclination layers 120$o$1 to be formed is the same as the number of the second inclination layers 120$o$2 to be formed. This allows the force in the direction to cancel the inclination of the first inclination layer 120$o$1 and the force in the direction to cancel the inclination of the second inclination layer 120$o$2 to work to cancel each other effectively. Hereby, it is possible to effectively restrain the occurrence of strain in the CFRP layer 120 due to inclinations of the fiber bundles 125, thereby making it possible to restrain the occurrence of strain in the tank 100. This accordingly makes it possible to restrain a decrease in the strength of the tank 100. Note that the number of the first inclination layers 120$o$1 to be formed may be different from the number of the second inclination layers 120$o$2 to be formed, or only the first inclination layer 120$o$1 or the second inclination layer 120$o$2 may be formed.

After a predetermined number of layers is formed in the reinforced-layer outer layer 120$o$, the resin in the fiber bundles 125 is hardened by heating the reinforced-layer outer layer 120$o$ at a temperature of 100 degrees Celsius to 170 degrees Celsius for 10 minutes to 120 minutes, for example, so that a structural body including the liner 110 and the CFRP layer 120 is formed.

As described above, when the reinforced-layer outer layer 120o is formed such that fibers are placed over the two dome-shaped reinforced-layer inner layers 122i, 123i, the fibers of the reinforced-layer outer layer 120o prevent the dome-shaped reinforced-layer inner layers 122i, 123i from separating from the cylindrical reinforced-layer inner layer 121i. This makes it possible to restrain the dome-shaped reinforced-layer inner layers 122i, 123i from coming off from the opposite ends of the cylindrical reinforced-layer inner layer 121i due to gas pressure. The reinforced-layer outer layer 120o just has a fiber amount that can prevent the dome-shaped reinforced-layer inner layers 122i, 123i from coming off from the cylindrical reinforced-layer inner layer 121i. Accordingly, the used amount of the fiber reinforced resin can be reduced in comparison with a helical layer formed in a cylindrical portion of a tank in the related art.

Figure 9:
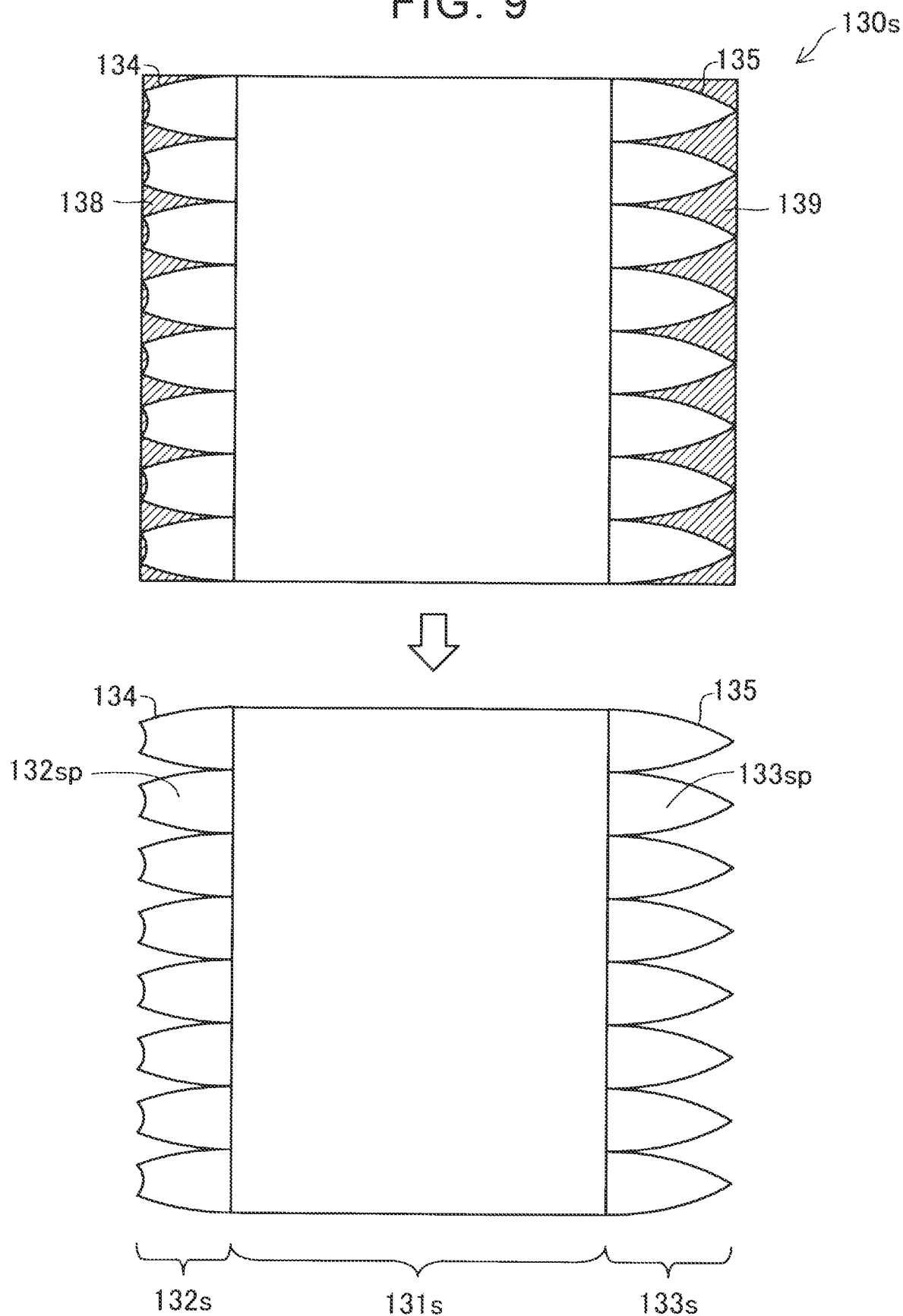
FIG. 9 is an explanatory view illustrating a step of forming a heat insulating sheet to form a heat insulating layer.

FIG. 9 is an explanatory view illustrating a step of forming a heat insulating sheet 130s to form the heat insulating layer 130. First, the heat insulating sheet 130s is prepared. The heat insulating sheet 130s is a sheet having a rectangular shape and containing graphite particles and urethane. The opposite end portions of the heat insulating sheet 130s are cut by use of the cuts 134, 135 so as to remove notches 138, 139. As a result, an intermediate portion 131s having a rectangular shape and dome forming portions 132s, 133s are formed. The dome forming portion 132s has a shape obtained by cutting a boat-shaped polyconic shape along an equator line, the boat-shaped polyconic shape being used when the surface of a globe is formed. The dome forming portion 132s can be divided into a plurality of dome forming pieces 132sp. The dome forming portion 133s also has a shape obtained by cutting a boat-shaped polyconic shape along an equator line, and the dome forming portion 133s can be divided into a plurality of dome forming pieces 133sp. Note that the dome forming piece 132sp has a shape to be obtained by cutting the vertex of the dome forming piece 133sp to be recessed. The cut part just corresponds to the top part of a dome when the dome forming pieces 132sp are formed into a dome shape. The cut parts of the dome forming pieces 132sp form, in the top part of the dome, an opening where the heat insulating sheet 130s is not provided. The mouth piece 140 is passed through the opening.

Figure 10:
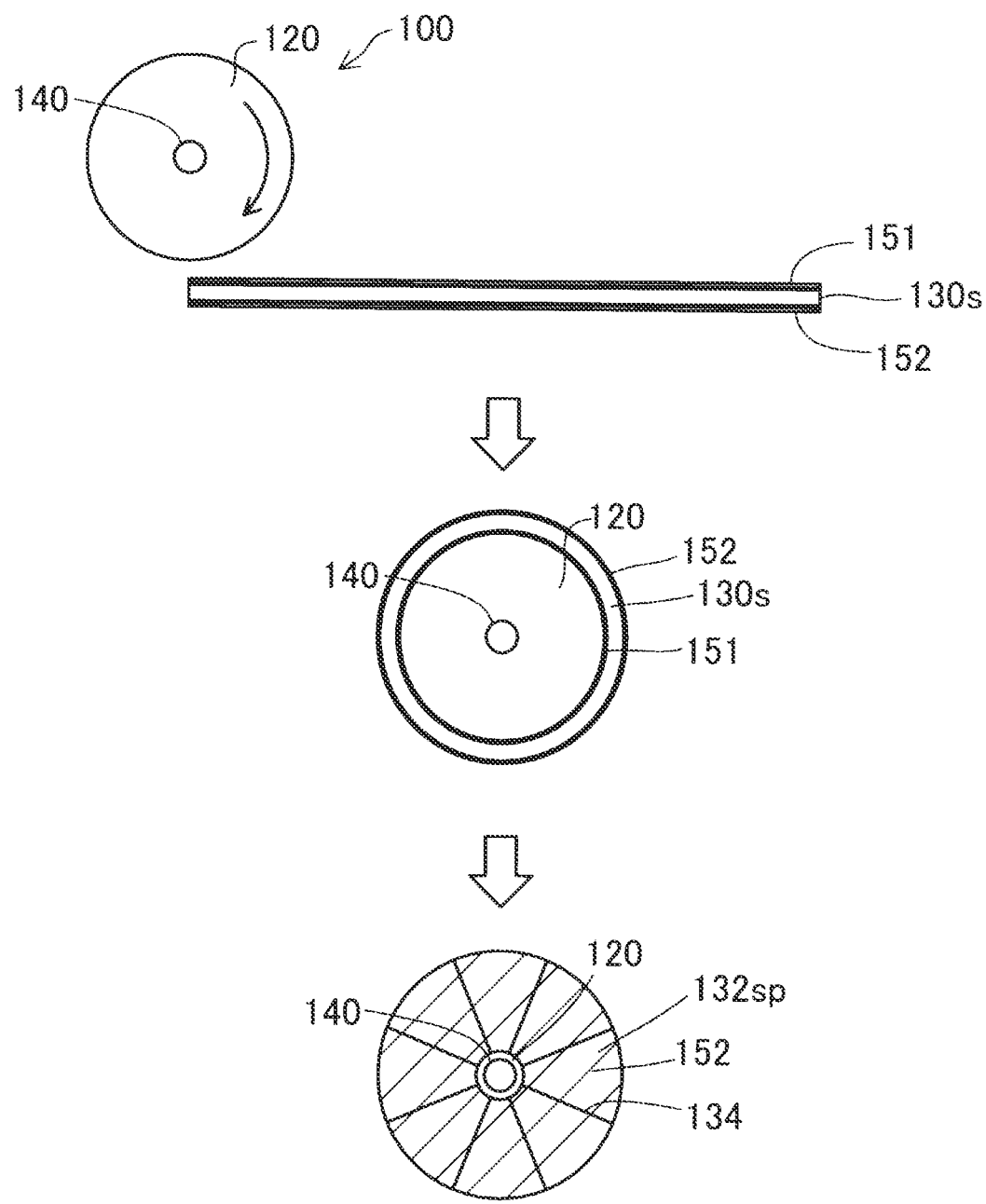
FIG. 10 is an explanatory view illustrating a step of forming the heat insulating layer on the tank on which the CFRP layer is formed.

FIG. 10 is an explanatory view illustrating a step of forming the heat insulating layer 130 on the tank 100 on which the CFRP layer 120 is formed. An adhesive agent 151 is applied to the whole surface, on the tank 100 side, of the heat insulating sheet 130s, and an adhesive agent 152 is applied only to the dome forming portions 132s, 133s on a surface opposite to the tank 100 side. Adhesive layers may be used instead of the adhesive agents 151, 152. The heat insulating sheet 130s is attached onto the CFRP layer 120 while the tank 100 on which the CFRP layer 120 is formed is being rotated. The dome forming pieces 132sp, 133sp are bent and attached to dome portions of the CFRP layer 120, so that the heat insulating layer 130 is formed.

Figure 11:
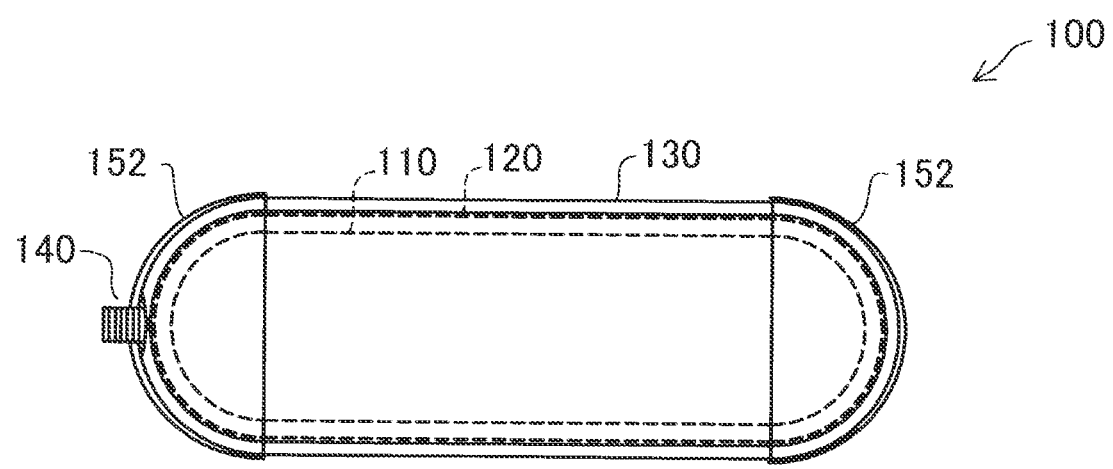
FIG. 11 is an explanatory view illustrating the tank after the heat insulating layer is formed.

FIG. 11 is an explanatory view illustrating the tank 100 after the heat insulating layer 130 is formed. No adhesive agent is exposed on the surface of the cylindrical portion 131 in the heat insulating layer 130, but the adhesive agent 152 is exposed on the surfaces of the dome-shaped portions 132, 133.

Figure 12:
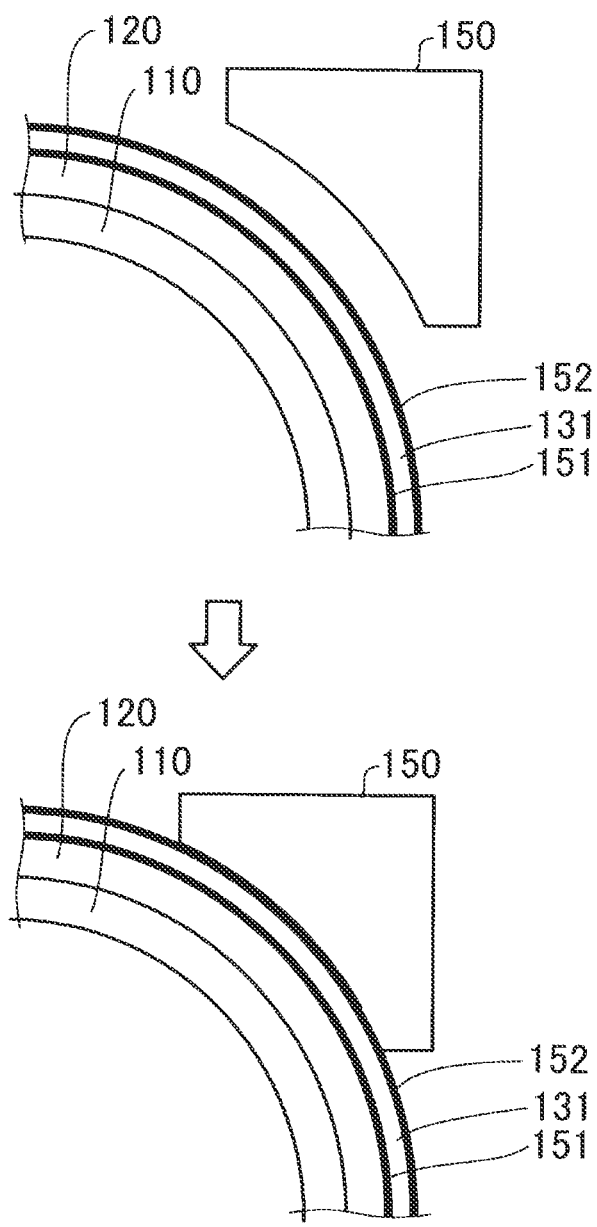
FIG. 12 is an explanatory view illustrating a step of bonding a tank protector to the heat insulating layer.

FIG. 12 is an explanatory view illustrating a step of bonding the tank protector 150 to the heat insulating layer 130. The tank protector 150 has a shape to be obtained by cutting a top part from a conical surface, for example. The tank protector 150 is made of polyurethane, for example. The tank protector 150 may include an expanded graphite layer. The tank protector 150 protects the tank 100 such that the tank 100 does not directly hit the ground and the like when the tank 100 falls, and when the tank protector 150 hits the ground, the tank protector 150 relaxes an impact. The tank protector 150 may include an expanded graphite layer. In addition to impact relaxation, the tank protector 150 can improve the fire-resisting property and heat-resisting property of the tank 100. As illustrated in FIG. 12, the adhesive agent 152 is exposed on the surfaces of the dome-shaped portions 132, 133 in the heat insulating layer 130. The tank protectors 150 are bonded to the adhesive agent 152 thus exposed.

In the present embodiment, after the step of forming the CFRP layer 120 as the fiber reinforced resin layer on the outer periphery of the liner 110 including the cylindrical portion 111 and the dome portions 112, 113 provided in the opposite ends of the cylindrical portion 111 in the axial direction, the step of winding the heat insulating sheet 130s around the CFRP layer 120 is performed. The heat insulating sheet 130s includes the notches 138, 139 in the opposite ends, of the heat insulating sheet 130s, that correspond to the dome portions 112, 113 so that the heat insulating sheet 130s fits the shapes of the dome portions 112, 113. Thus, the heat insulating layer 130 can be formed easily by winding the heat insulating sheet 130s around the cylindrical portion 111 and the dome portions 112, 113.

The dome-shaped portion 132 is formed by the dome forming pieces 132sp, and the dome-shaped portion 133 is formed by the dome forming pieces 133sp, so that the heat insulating layer 130 fitting the shapes of the dome portions 112, 113 can be formed. In the example illustrated in FIG. 9, eight dome forming pieces 132sp and eight dome forming pieces 133sp are formed. However, the number of the dome forming pieces 132sp and the number of the dome forming pieces 133sp may be increased by narrowing the width of the dome forming pieces 132sp in the circumferential direction and the width of the dome forming pieces 133sp in the circumferential direction. This can make the heat insulating layer 130 more easily follow the dome shapes.

The heat insulating sheet 130s includes the adhesive agent 151 on a first surface of the intermediate portion 131s corresponding to the cylindrical portion 111, and the heat insulating sheet 130s includes the adhesive agents 151, 152 on the opposite surfaces of each of the dome forming portions 132s, 133s that are end parts corresponding to the dome portions 112, 113. Accordingly, after the heat insulating sheet 130s is attached to the CFRP layer 120, the adhesive agent 152 is exposed on the dome forming portions 132s, 133s. As a result, the tank protectors 150 can be bonded by use of the adhesive agent 152 thus exposed. That is, it is not necessary to apply a new adhesive agent to bond the tank protectors 150. Note that adhesive layers may be used instead of the adhesive agents 151, 152.

Second Embodiment

Figure 13:
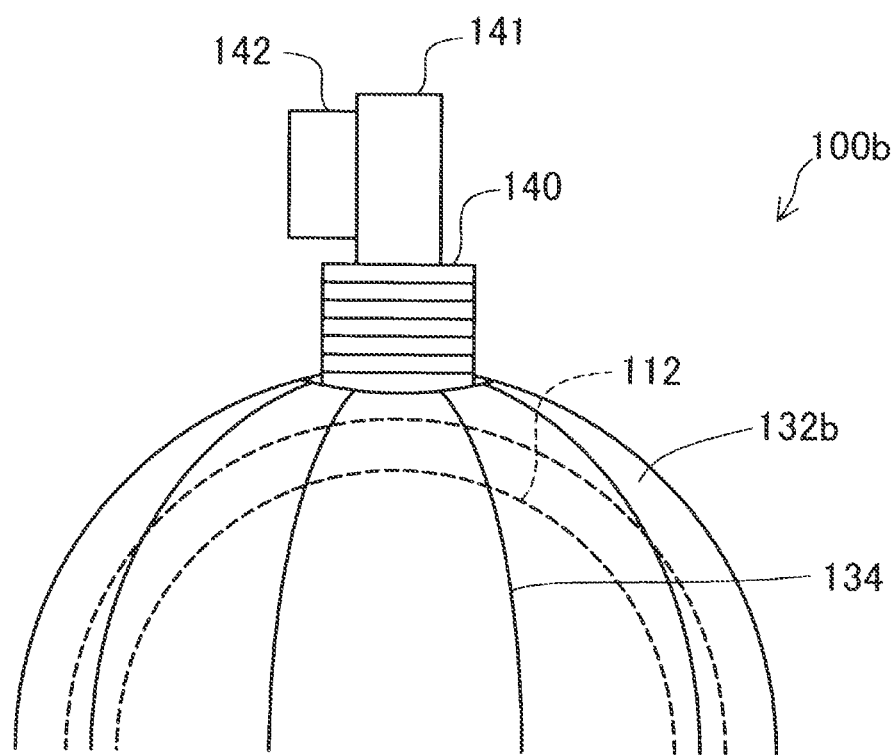
FIG. 13 is an explanatory view illustrating a tank according to a second embodiment.

FIG. 13 is an explanatory view illustrating a tank 100b according to a second embodiment. In FIG. 13, the tank protector is not illustrated. The tank 100b according to the second embodiment includes a main stop valve 141 and a fusible plug valve 142 in the mouth piece 140. The main stop valve 141 is a valve configured to discharge and stop discharging gas inside the tank 100b. The fusible plug valve 142 is attached to the main stop valve 141. The fusible plug valve 142 has a hole via which the inside of the tank 100b communicates with the outside of the tank 100b, and the hole is closed by metal having a low melting point. When the tank 100b reaches a high temperature, the metal melts due to heat, so that the hole via which the inside of the tank 100b communicates with the outside of the tank 100b is opened. The fusible plug valve 142 releases the pressure in the tank 100b from the hole thus opened. In the second embodiment, in order that heat is easily transmitted to the fusible plug valve 142, heat insulation performance of a dome-shaped portion 132b of the heat insulating layer 130 on a side where the mouth piece 140 is provided is made lower than heat insulation performance of a dome-shaped portion 133b on a side where the mouth piece 140 is not provided.

Figure 14:
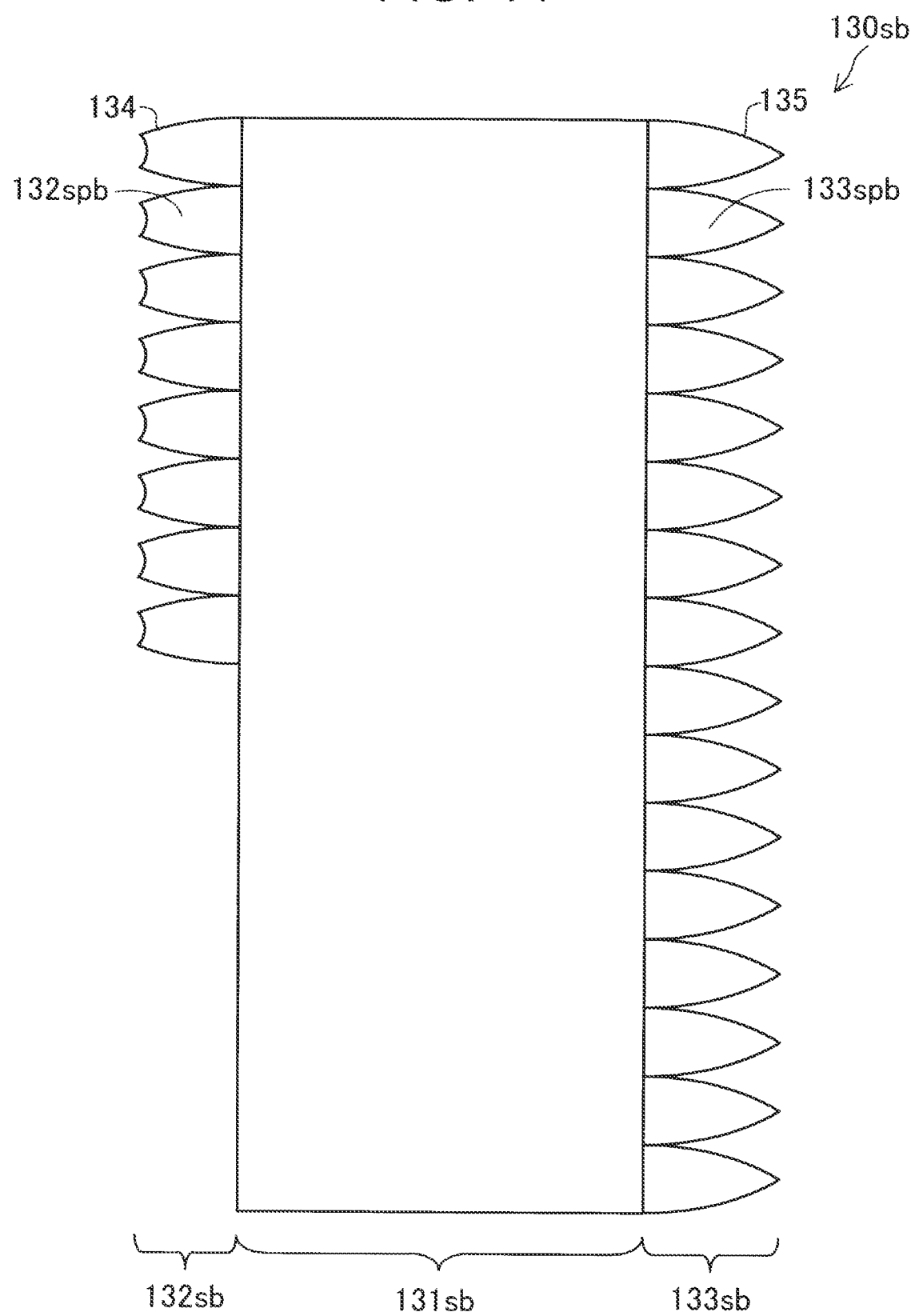
FIG. 14 is an explanatory view illustrating one example of a configuration in which heat insulation performance of a first dome-shaped portion is made lower than heat insulation performance of a second dome-shaped portion.

FIG. 14 is an explanatory view illustrating one example of a configuration of a heat insulating sheet 130sb by which the heat insulation performance of the dome-shaped portion 132b is made lower than the heat insulation performance of the dome-shaped portion 133b. The heat insulating sheet 130sb is different from the heat insulating sheet 130s according to the first embodiment in that an intermediate portion 131sb and a dome forming portion 133sb are longer than a dome forming portion 132sb in a winding direction (the up-down direction in FIG. 14) and that the number of dome forming pieces 132spb is half of the number of dome forming pieces 133spb. In this configuration, when the heat insulating sheet 130sb is wound around the tank 100b, the heat insulating sheet 130sb is formed in two layers in the cylindrical portion 131b and the dome-shaped portion 133b, whereas the heat insulating sheet 130sb is formed in one layer in the dome-shaped portion 132b. Accordingly, the heat insulation performance of the dome-shaped portion 132b can be made lower than the heat insulation performance of the dome-shaped portion 133b.

Figure 15:
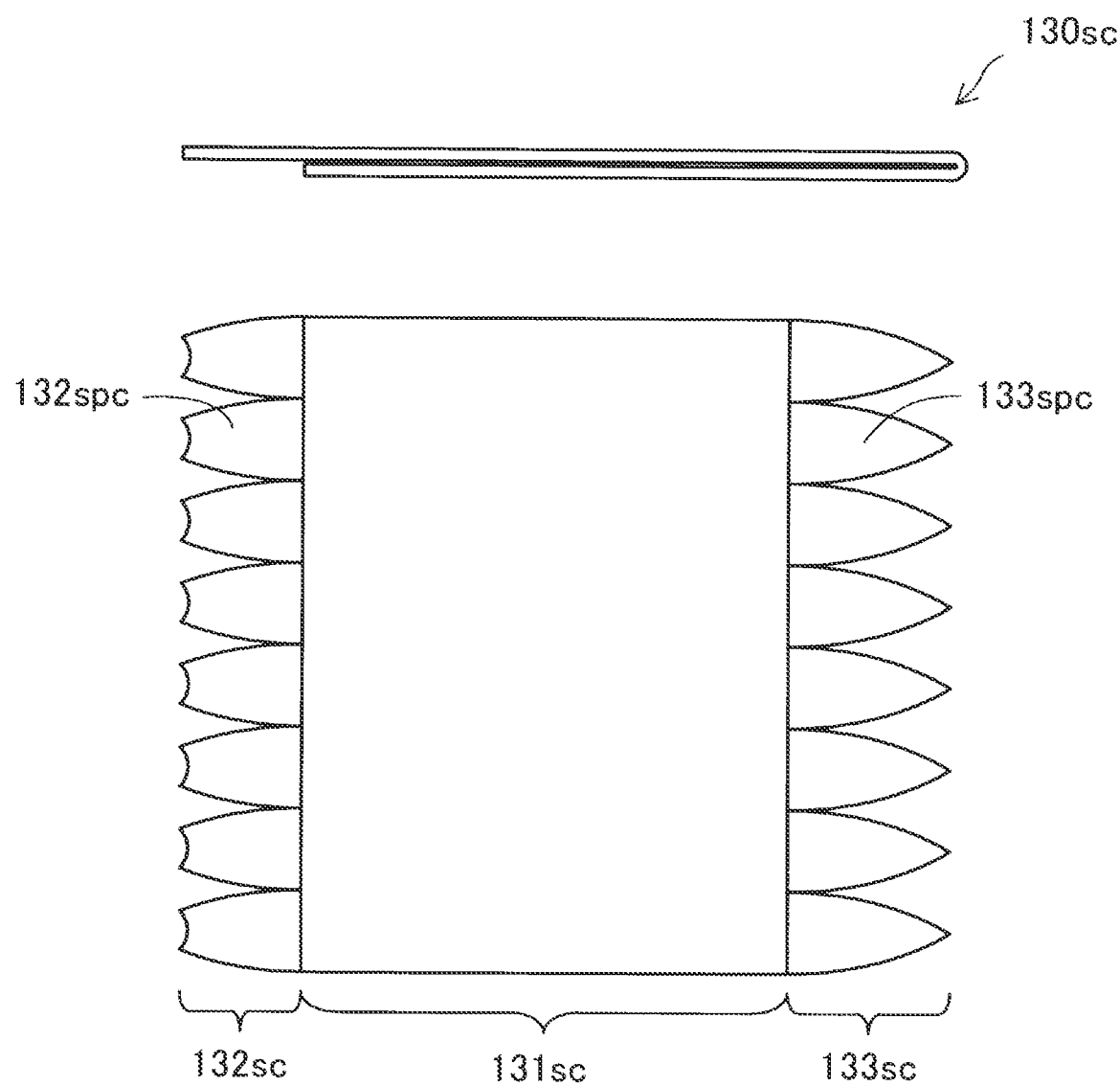
FIG. 15 is an explanatory view illustrating another example of the configuration in which the heat insulation performance of the first dome-shaped portion is made lower than the heat insulation performance of the second dome-shaped portion.

FIG. 15 is an explanatory view illustrating another exemplary configuration in which heat insulation performance of a dome-shaped portion 132c is made lower than heat insulation performance of a dome-shaped portion 133c. In comparison with the heat insulating sheet 130s according to the first embodiment, a heat insulating sheet 130sc is made long in the axial direction of a tank 100c and is folded. On this account, a dome forming portion 132sc and dome forming pieces 132spc are formed in one layer, whereas an intermediate portion 131sc, a dome forming portion 133sc, and dome forming pieces 133spc are formed in two layers. On this account, when the heat insulating sheet 130sc is wound around the CFRP layer 120, the heat insulation performance of the dome-shaped portion 132c can be made lower than the heat insulation performance of the dome-shaped portion 133c.

In the second embodiment, the heat insulation performance of the dome-shaped portion 132b, 132c on the side where the mouth piece 140 is provided is made lower than the heat insulation performance of the dome-shaped portion 133b, 133c on the side where the mouth piece 140 is not provided. Accordingly, when the tank 100b, 100c is heated, heat can be transmitted to the fusible plug valve 142 via the mouth piece 140, so that the fusible plug valve 142 can be opened. As a result, it is possible to decrease the pressure inside the tank 100b, 100c.

In the second embodiment, the number of layers in the heat insulating sheet 130sb, 130sc in the dome-shaped portion 132b, 132c is made smaller than the number of layers in other parts. However, the thickness of the heat insulating sheet 130sb, 130sc on the dome-shaped portion 132b, 132c side may be made thinner than the thicknesses of other parts.

Third Embodiment

Figure 16:
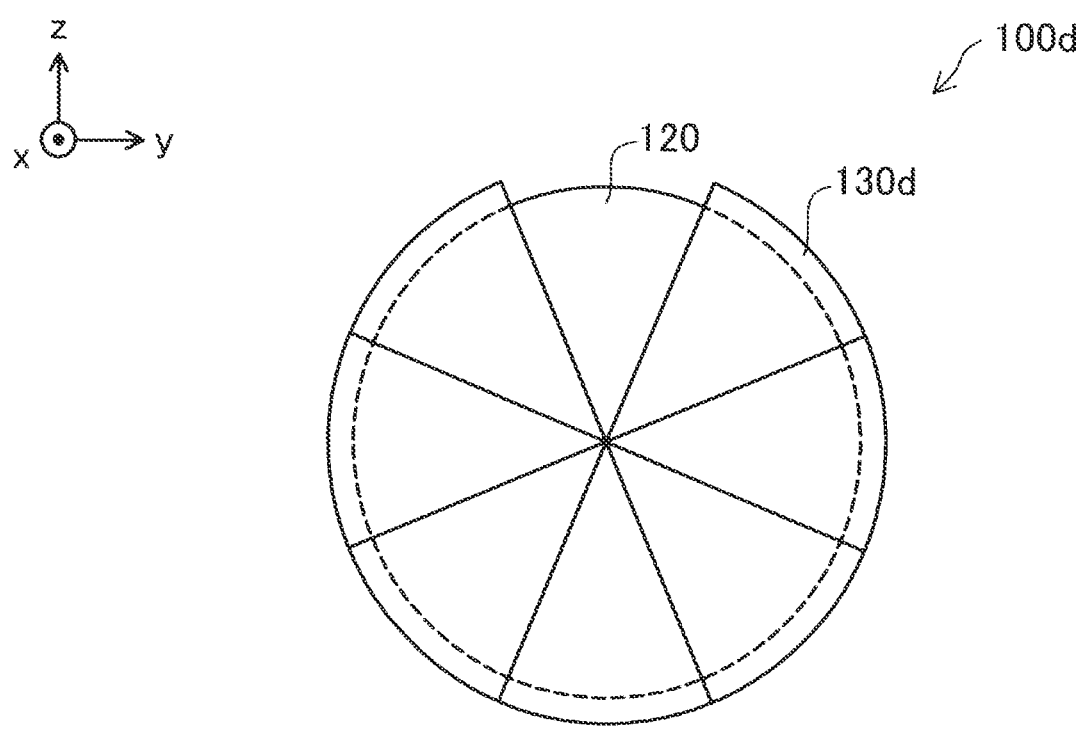
FIG. 16 is an explanatory view illustrating a tank according to a third embodiment.

FIG. 16 is an explanatory view illustrating a tank 100d according to a third embodiment. In the first embodiment and the second embodiment, the heat insulating layer 130, 130b, 130c surrounds the tank 100, 100b, 100c along the circumferential direction. However, in the tank 100d according to the third embodiment, a heat insulating layer 130d is not provided in an upper part in the vertical direction (a+z direction). When flames occur, generally, the flames warm the tank 100d from its lower side. On that account, the heat insulating layer 130d should be provided to protect the lower side of the tank 100d. Note that, depending on an arrangement position of the tank 100d in a vehicle, such a case is conceivable that the flames warm the tank 100d from directions other than the lower side. However, in this case, a region where the heat insulating layer 130d is not provided should be formed on a side opposite to the direction where the flames warm the tank 100d.

In each of the above embodiments, the heat insulating sheet 130s has the notches 138, 139 that form a boat-shaped polyconic shape but may have other shapes. Further, the heat insulating sheet 130s may have simple cuts. Further, the dome forming pieces 132sp may overlap each other when a dome is formed, or a gap may be formed between the dome forming pieces 132sp adjacent to each other. The same can be said about the dome forming pieces 133sp.

In each of the above embodiments, the CFRP layer 120 manufactured separately is placed on the outer side of the liner 110, but the CFRP layer 120 may be formed by filament winding. Further, the CFRP layer 120 may be formed first, and the liner 110 may be formed after that by injecting resin inside the CFRP layer 120.

The disclosure is not limited to the above embodiments and is achievable in various configurations within a range that does not deviate from the gist of the disclosure. For example, technical features of the embodiments, corresponding to the technical features of the aspects described in SUMMARY, can be replaced or combined appropriately, in order to solve some or all of the problems described above or in order to achieve some or all of the above effects. Further, the technical features can be deleted appropriately if the technical features have not been described as essential in the present specification.

The invention claimed is:

1. A manufacturing method for manufacturing a tank, comprising:
   a step of forming a structural body comprising a liner and a fiber reinforced resin layer placed on an outer periphery of the liner, the structural body including:
      a cylindrical portion,
      dome portions provided at opposite ends of the cylindrical portion in an axial direction of the cylindrical portion,
      a mouth piece, and
      a fusible plug valve attached to the mouth piece, the mouth piece and the fusible plug valve being provided in one of the dome portions;
   a step of winding a heat insulating sheet around the fiber reinforced resin layer after the step of forming the structural body, the heat insulating sheet having notches in dome forming portions provided to correspond to the dome portions; and
   a step of covering the dome portions with the dome forming portions of the heat insulating sheet, wherein a number of layers of the heat insulating sheet in one of the dome forming portions is smaller than a number of layers of the heat insulating sheet in an other of the dome forming portions.

2. The manufacturing method according to claim 1, wherein:
the heat insulating sheet includes adhesive layers or adhesive agents on opposite surfaces of the dome forming portions;
the heat insulating sheet includes an adhesive layer or an adhesive agent on one surface of a region between the dome forming portions; and
after the step of winding the heat insulating sheet, the adhesive layers or the adhesive agents provided in the dome forming portions corresponding to the dome portions are exposed, and tank protectors are attached to the dome forming portions.

3. The manufacturing method according to claim 1, wherein the number of layers of the heat insulating sheet in the one of the dome forming portions is one, and the number of layers of the heat insulating sheet in the other of the dome forming portions is two.

4. A tank comprising:
a structural body constituted by a liner and a fiber reinforced resin layer formed on an outer periphery of the liner, the structural body including:
a cylindrical portion,
dome portions provided at opposite ends of the cylindrical portion in an axial direction of the cylindrical portion,
a mouth piece, and
a fusible plug valve attached to the mouth piece, the mouth piece and the fusible plug valve being provided in one of the dome portions; and
a heat insulating layer placed on an outer side of the structural body, the heat insulating layer being formed by use of a heat insulating sheet, wherein the heat insulating sheet includes
dome forming portions covering the dome portions, the dome forming portions having notches, wherein a number of layers of the heat insulating sheet in one of the dome forming portions is smaller than a number of layers of the heat insulating sheet in an other of the dome forming portions, and
an intermediate portion provided as a region between the dome forming portions such that the intermediate portion is wound around the cylindrical portion of the structural body in a circumferential direction of the cylindrical portion.

5. The tank according to claim 4, comprising tank protectors provided on outer sides of the dome portions.

6. The tank according to claim 4, wherein the number of layers of the heat insulating sheet in the one of the dome forming portions is one, and the number of layers of the heat insulating sheet in the other of the dome forming portions is two.

* * * * *